W. G. STOCKHAM.
TIRE ARMOR.
APPLICATION FILED NOV. 18, 1920.
1,417,359.
Patented May 23, 1922.
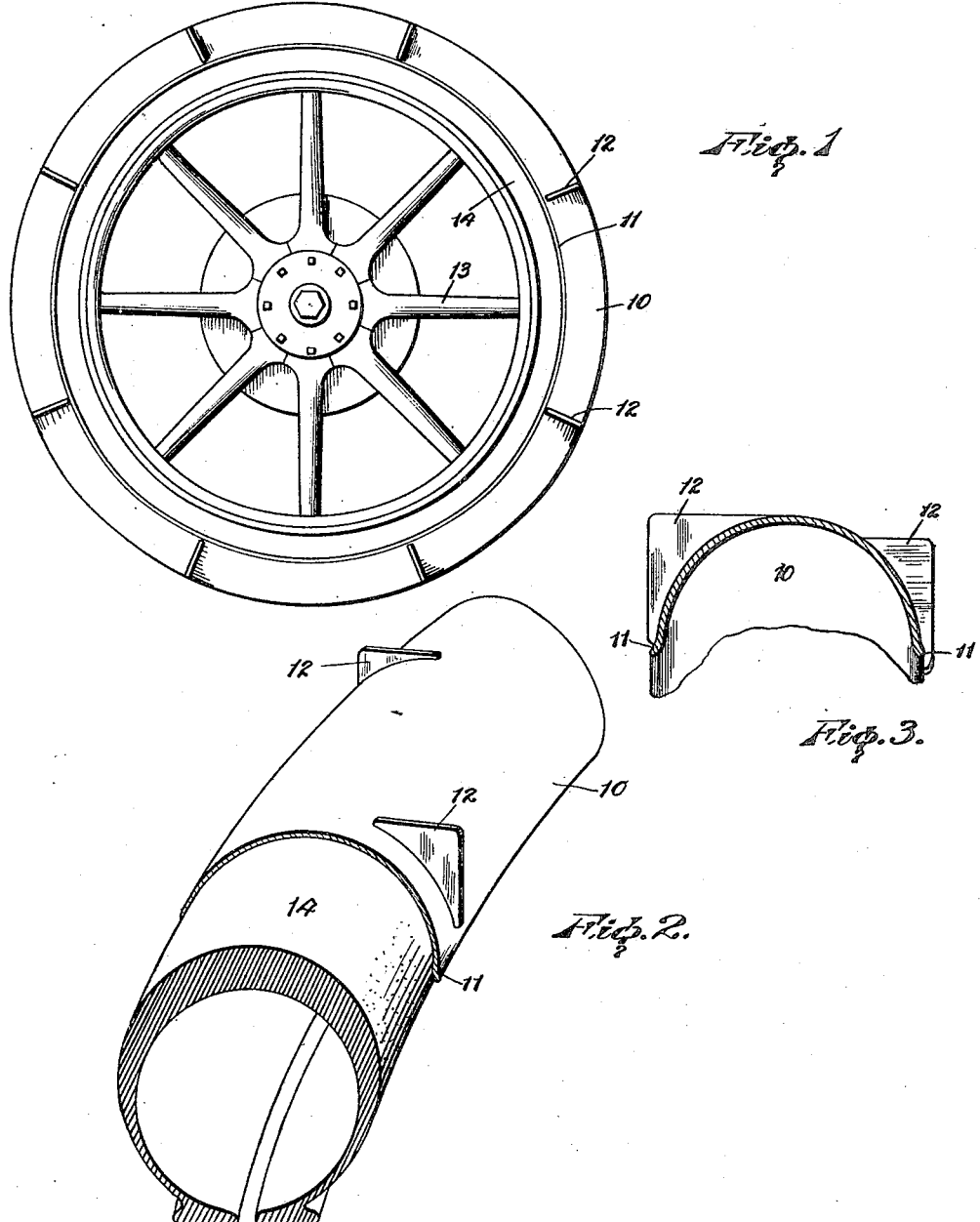

UNITED STATES PATENT OFFICE.

WILLIAM G. STOCKHAM, OF PIQUA, OHIO.

TIRE ARMOR.

1,417,359.

Specification of Letters Patent.  Patented May 23, 1922.

Application filed November 18, 1920. Serial No. 424,894.

*To all whom it may concern:*

Be it known that I, WILLIAM G. STOCKHAM, citizen of the United States, residing at Piqua, in the county of Miami and State of Ohio, have invented certain new and useful Improvements in Tire Armor, of which the following is a specification.

This invention relates to an improved tire armor and has as one of its principal objects to provide a device of this character which may be readily employed in connection with any ordinary pneumatic tire now in common use and which will serve to effectually protect the tread of the tire as well as the sides thereof.

A further object of the invention is to provide a tire armor which will be entirely practical from the standpoint of manufacture as well as the standpoint of use and which, in practice, will be held upon the tire without the use of fastening devices.

And the invention has as a still further object to provide a device of this character employing reinforcing fins for the body of the device and wherein said fins will serve as calks so disposed that, under normal conditions, as for instance, upon a hard roadway, a smooth tread surface will be presented to the roadway while, when traveling through mud or upon a soft roadway, the calks will be brought into engagement with the ground so that the armor will thus provide a traction device for the tire.

Other and incidental objects will appear hereinafter.

In the drawing:

Figure 1 is a side elevation showing my improved armor in connection with a wheel and tire of conventional design.

Figure 2 is a fragmentary perspective view of the device, and

Figure 3 is a detail transverse section view of the device.

In carrying the invention into effect, I employ a channeled annulus 10. This annulus is preferably constructed of suitable resilient sheet metal and is shaped to snugly fit the usual pneumatic tire, the annulus being, of course, of a diameter to surround the tire. The annulus will thus protect the tread of the tire and, as will be observed, said annulus is formed to extend well down the sides of the tire so as to also protect the tire at its sides. At its side margins the annulus is, as particularly shown in Figure 3, formed with oppositely directed lateral lips or flanges 11 which will project away from the sides of the tire so that the edges of the annulus will not abrade the tire. Throughout its entire circumference the annulus is preferably smooth both at its inner and outer sides so that the inner side of the annulus will present a smooth surface to a tire while the outer side of the annulus will present a smooth surface tending to prevent the collection of mud or other foreign matter upon the annulus. Integrally formed on or otherwise secured to each of the side portions of the annulus is an annular series of spaced radially disposed substantially triangular shaped reinforcing fins 12, the fins of one series being staggered with respect to the fins of the other. These fins, like the annulus, are preferably formed of suitable resilient sheet metal and will, as will be appreciated, tend to prevent buckling or transverse flattening of the annulus. As will be best observed upon reference to Figure 3, the fins slightly overhang the side edges of the annulus. Preferably, the fins are formed with straight outer side edges as well as straight outer end edges and it is now to be particularly noted that the fins are so disposed that the outer end edges thereof lie substantially flush with the crown of the annulus at its outer side. Consequently, when passing over a hard roadway, the crown of the annulus will, since the annulus cannot sink into the roadway, present a smooth surface thereto so that the fins will not either mar the road or impede the rolling motion of the armor. On the other hand, when traveling through mud or passing over soft roads, the annulus will, of course, sink into the roadway so that the fins will thus be caused to engage with the ground. Consequently, the fins will then provide effective traction calks so that under these conditions the armor will constitute a traction device for the tire equipped therewith. Preferably, the sides of the fins are flat and smooth so that when the annulus is rotated, any mud upon the fins will be thrown therefrom by centrifugal force.

In the drawing, I have shown my improved armor in connection with a wheel and tire of conventional design. The wheel is indicated at 13 and the tire at 14. By deflating the tire, the armor may be readily arranged to surround the tire so that, upon subsequent inflation of the tire, the tire will be distended within the armor to firmly coact therewith. The armor will thus, without the use of fastening devices, be securely held upon the tire and, as will be appreciated, the fins 12 will tend to prevent arcuate flexing of the side portions of the annulus 10 so that said side portions will be held to snugly fit the tire. However, in order that the lips 11 may not be caused to gouge the tire, the fins terminate at their inner ends short of said lips while to provide an unobstructed tread surface at the crown of the annulus, the confronting points of the fins at their outer ends terminate at the side margins of the crown. However, attention is directed to the fact in this connection, that should skidding occur, the tire will, under the influence of the weight thereof, tend to roll or flex laterally, causing the series of fins at either one side or the other of the armor to be brought into engagement with the ground. The fins will accordingly tend to prevent skidding and, as will be perceived, increase in lateral stress upon the tire will tend to sink the fins deeper into the ground, thus affording a more secure purchase. As will accordingly be seen, I provide an armor of highly efficient design and a device which may be employed in connection with any ordinary automobile tire.

Having thus described the invention, what is claimed as new is:

The combination with a pneumatic tire, of an armor therefor comprising a continuous resilient metallic band completely encircling the circumference of the tire and covering the major portion of the side walls thereof and held in position on said tire solely by the inherent resiliency of the band when the tire is inflated, said band having its side edges formed with terminal laterally curved lips and its side walls provided with spaced relatively thin substantially triangular traction plates disposed at substantially right angles thereto with their outer end edges flat and arranged in the same transverse plane as the crown of the band and merging into said crown and their outer side edges straight and terminating short of the lips, said traction plates being disposed in staggered relation with the exterior walls of the band between said plates at both the sides and crown of the band smooth and unobstructed.

In testimony whereof I affix my signature.

WILLIAM G. STOCKHAM. [L. S.]